Sept. 20, 1966 M. DISTEL 3,274,388
INFRARED DETECTOR AND SYSTEM FOR TRANSIENT SIGNALS
Filed July 28, 1950

INVENTOR.
MAURICE DISTEL
BY
Harry M. Saragovitz
Attorney

United States Patent Office 3,274,388
Patented Sept. 20, 1966

3,274,388
INFRARED DETECTOR AND SYSTEM FOR
TRANSIENT SIGNALS
Maurice Distel, Red Bank, N.J., assignor to the United
States of America as represented by the Secretary of
the Army
Filed July 28, 1950, Ser. No. 176,512
9 Claims. (Cl. 250—83.3)

The invention described herein may be manufactured and used by or for the Government for governmental purposes, without the payment of any royalty thereon.

This invention relates to image translating devices and more particularly to means for converting an image formed by transient infrared radiation into an electrical signal which can be recorded or translated.

In military applications, it is often necessary to locate the position of enemy artillery so that effective action may be taken. One method of location is called flash ranging. In this method the position is computed from the observed horizontal angles or azimuths of the flash from each of the two spaced observation stations.

While there are many known photoelectric devices which will receive and translate radiation lying in the visible portion of the spectrum, these are not generally satisfactory. One reason is that they are not sufficiently sensitive in the infrared region beyond 0.8 to 5 microns in which, investigation has shown, a major portion of the radiation from a gun flash lies. While the thermal type detector is sensitive to radiation in the far infrared region of the spectrum it is unsuitable because of its slowness of response.

The photoconductive cell, such as lead sulphide which is sensitive in the region 1–3 microns, would seem to be the best detector of such flash targets in comparison with photoemissive surfaces which cover the region 0.4 to 1.2 microns. The difficulty which prevented the use of lead sulphide or other photoconductors, such as lead teluride and lead selenide, as an infrared scanning detector with the success obtained in the visible region with photoemissive devices, such as the iconoscope or image orthicon, lies in the dissimilar photoelectric effect. When photoemission takes place, a charge configuration corresponding to the scene is stored, until scanned, on a dielectric or semiconductor target through the mechanism of an irreversible flow of emitted electrons (external photo effect). Photoconduction, on the other hand, is inherently a closed circuit phenomenon permitting the bilateral flow of electrons so that the attainment of picture storage is no longer simple.

While it might be possible to obviate the need for storage by scanning very rapidly so that the gun flash (which lasts approximately .02 second) is not missed, further problems are raised such as, increased bandwidth necessary for transmission and also means must be provided for the elimination of the effect of background light so that only the gun flash is transmitted.

In some applications, it is desired to limit the bandwidth over which the information is to be translated. The scanning rate must then be relatively slow. For this reason the photoemissive type of detector could not be used even if it could operate in the infrared region as it requires rather rapid scanning so that the transient phenomena will not be lost in the background light. Although there are circuits which will effectively reduce the bandwidth, they are, however, rather complex and cumbersome.

It is therefore an object of this invention to provide an improved radiation detecting and translating device.

It is another object of this invention to provide an infrared radiation detecting and translating device which can detect emission in the far infrared region.

It is still another object to provide an infrared detecting and translating device using a photoconductive element in which transient radiation may be easily detected and translated over a channel of narrow bandwidth.

According to the invention there is provided a plurality of photoconductive elements, each of said elements being in circuit with means for detecting and storing voltages representing transient optical phenomena and means for translating said voltages.

The invention itself and its operation, together with additional objects and advantages thereof, will be best understood from the following description taken in connection with the accompanying drawings in which.

Figure 1:
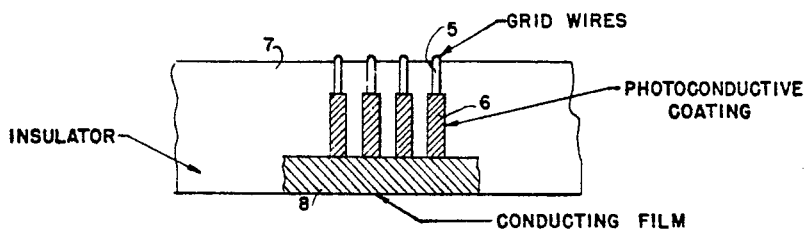
FIG. 1 shows the construction of a grid made of individual photoconductive elements.

Referring now to FIG. 1, there is shown a construction of a grid wherein the grid wires 5 are spaced and aligned on an insulated plate 7. Each of the grid wires 5 is coated with a photoconductive substance 6, such as lead sulphide to form a photoconductive element. A conducting film 8 is connected to all the photoconductive coatings and to a common battery source 18.

Figure 2:
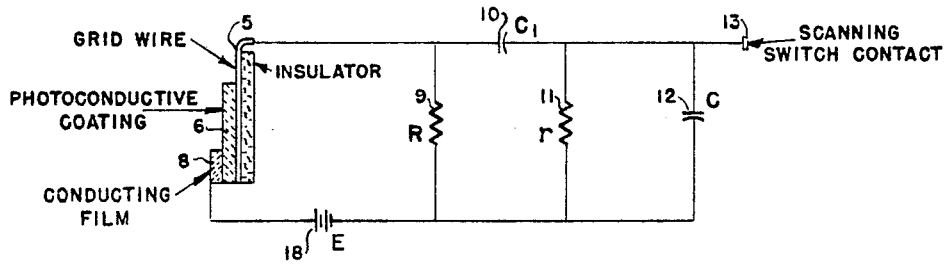
FIG. 2 shows a circuit including one of said photoconductive elements.

FIG. 2 shows a circuit incorporating one of the photoconductive elements. A common battery source 18 is connected to the conducting film 8 which is in electrical contact with the photoconductive element. In series with both the battery 18 and the photoconductive element is an output circuit comprising resistors 9 and 11 and capacitors 10 and 12. The voltage across resistor 9 will vary due to the variation of the resistance of the photoconductive element occasioned by changes in the radiation falling upon it. This voltage is coupled to storage capacitor 12 through the circuit composed of blocking capacitor 10 and resistor 11. The capacitor 10 operates to separate the D.C. component of voltage due to the background lighting from the transient voltage due to the gun flash. The storage capacitor 12 is connected to a scanning switch contact 13, which will permit mechanical connection.

Figure 3:
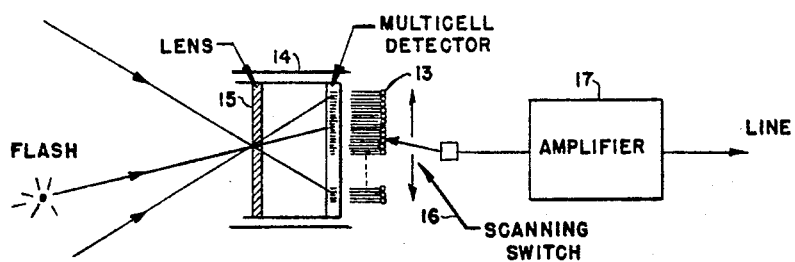
FIG. 3 shows an embodiment of a complete detector.

FIG. 3 shows one embodiment of the detector in which a lens 15 is placed before the grid to focus the field of view upon the grid elements. The scanning contacts 13 are so disposed as to permit mechanical scanning by switch 16, and the output is connected to an amplifier 17. The reason for using mechanical scanning, preferably of the make and break multiple contact type, is that it has an inherently lower noise level than a sliding contact or electronic scanning. The individual photoconductive elements are aligned and so spaced as to occupy a definite angle or position in the field of view and so constitute fiducial lines. The photoconductive grid may be enclosed and cooled so as to improve the signal to noise ratio.

The operation of the device is simple. Radiation of the proper wavelength passing through the lens 15 is focused on the photoconductive grid elements causing a change of resistivity and consequently a change of voltage across resistor 9. This background radiation is relatively constant, and, consequently, condenser 10 acts to block the steady voltage produced so that no voltage appears across storage condenser 12. A transient voltage due to a gun flash will not be blocked and will charge condenser 12. Resistor 11 is the charging resistor for capacitor 10 but, since it is in parallel with condenser 12, it will also permit discharge of condenser 12 and so will tend to reduce the average potential in condenser 12. This discharge may be prevented by introducing a rectifying or unidirectional device in series with condenser 12 and resistor 11. In view of the normally low voltage output, a preamplifier (not shown) to raise the voltage may be required in order to operate the rectifier. However, considering the present state of the art, it is believed that the improvement in storage resulting from the use of a rectifier would not justify the additional equipment required. The high side of the condenser 12 is connected to a scanning switch contact 13. The contacts 13 from all of the photoconductive elements may be aligned or arranged in a circle and so may form part of a make-break type which, experiment has shown, has a low noise level. However, any other type of scanning may be used as long as the signal intensity is above the noise caused by the scanning.

Various modifications of the apparatus of the invention will suggest themselves to those skilled in the art. It is to be understood therefore that the foregoing is to be interpreted as illustrative and not in a limiting sense except as required by the spirit of the appended claims.

What is claimed is:

1. A system for translating transient phenomena comprising a circuit including a photoconductive element, storage means coupled to said circuit for storing potentials resulting solely from changes in resistance of said photoconductive element due to said transient phenomena, and a translating circuit coupled to said storage element and responsive to the potentials stored therein.

2. The device according to claim 1, in which said photoconductive element has a maximum sensitivity in the region of the spectrum lying between 0.8 and 5.0 microns.

3. The device according to claim 1, wherein said photoconductive element is lead sulphide.

4. A system for translating transient optical phenomena comprising a source of potential, a photoconductive element in series with said source, an output means for storing and translating voltages representing solely said transient phenomena; said output means comprising an impedance in series with said photoconductive element and said source of potential, means coupled to said impedance for storing the voltage changes produced across said impedance due to said transient phenomena, and a translating circuit for periodically discharging said storage means.

5. A radiation detecting and translating device comprising a plurality of photoconductive elements having a maximum sensitivity in the far infrared radiation band, a source of potential connected to said elements, a storage means in the output of each of said elements for storing voltages representing transient radiation phenomena and means for sequentially scanning said storage means at a slow rate so that the duration of each scan is greater than the duration of said transient radiation.

6. The device as in claim 5 wherein said isolating and storing means comprises an impedance in series with each of said elements and said source of potential, a storage capacitor, and means for applying only the transient voltage developed across said impedance to charge said storage capacitor.

7. The device according to claim 6 in which said scanning means comprises a multielement make-break type switch.

8. A radiation detecting and translating device comprising a plurality of aligned photoconductive elements having a maximum sensitivity in the far infrared radiation band, a source of potential connected to said elements, means in the output of each of said elements for isolating and storing voltages representing transient radiation phenomena and means for sequentially scanning said storing means at a slow rate so that the duration of each scan is greater than the duration of said transient radiation.

9. A radiation detecting and translating device comprising a plurality of horizontally aligned photoconductive elements having a maximum sensitivity in the infrared radiation band between 0.8 and 5 microns; a source of potential connected to said elements; a separate load impedance in series with each of said elements and said source of potential; output means for each of said impedances, each output means comprising a resistance-capacitance circuit for blocking the relatively steady voltage caused by background radiation and for passing the varying voltage caused by transient radiation, and a storage capacitor connected to be charged by said varying voltage; and means for sequentially scanning said storage capacitors including a multielement make-break type switch.

References Cited by the Examiner

UNITED STATES PATENTS

| | | | |
|---|---|---|---|
| 1,880,289 | 10/1932 | Sukumlyn | 178—7 X |
| 2,401,396 | 6/1946 | Wolfner | 318—480 X |
| 2,421,476 | 6/1947 | Belar et al. | 318—480 X |
| 2,499,941 | 3/1950 | Benfer | 343—11 |
| 2,540,490 | 2/1951 | Rittner | 250—214 X |

RALPH G. NILSON, *Pirmary Examiner.*

GEORGE R. DOUGLAS, WILLIAM GILES, ROGER L. CAMPBELL, *Examiners.*

V. LAFRANCHI, L. N. DAVIS, J. H. LINSCOTT, M. A. LEAVITT, *Assistant Examiners.*